United States Patent
Lee et al.

(10) Patent No.: US 11,858,831 B2
(45) Date of Patent: Jan. 2, 2024

(54) DESALTING APPARATUS USING SOLVENT AND THE METHOD THEREOF

(71) Applicants: Korea University Research and Business Foundation, Sejong Campus, Sejong-Si (KR); RESEARCH TRIANGLE INSTITUTE, Research Triangle Park, NC (US)

(72) Inventors: Jae Woo Lee, Seoul (KR); Young Chul Choi, Alpharetta, GA (US); Ou Kyung Choi, Yongin-si (KR); Gyu Dong Kim, Cary, NC (US); Dan Dan Dong, Sejong-si (KR); Jun HO Seo, Sejong-si (KR)

(73) Assignees: Korea University Research and Business Foundation, Seoul (KR); RESEARCH TRIANGLE INSTITUTE, Research Triangle Park, NC (US)

( * ) Notice: Subject to any disclaimer, the term of this patent is extended or adjusted under 35 U.S.C. 154(b) by 313 days.

(21) Appl. No.: 17/227,581

(22) Filed: Apr. 12, 2021

(65) Prior Publication Data
US 2021/0230020 A1     Jul. 29, 2021

Related U.S. Application Data

(63) Continuation of application No. PCT/KR2019/005394, filed on May 7, 2019.

(30) Foreign Application Priority Data

Oct. 11, 2018   (KR) .................. 10-2018-0120829

(51) Int. Cl.
*C02F 1/26*     (2023.01)
*B01D 11/04*   (2006.01)
(Continued)

(52) U.S. Cl.
CPC .............. *C02F 1/265* (2013.01); *B01D 9/00* (2013.01); *B01D 11/0488* (2013.01);
(Continued)

(58) Field of Classification Search
CPC .............. C02F 1/265; C02F 2001/5218; C02F 2103/08; C02F 2209/02; C02F 2305/14;
(Continued)

(56) References Cited

U.S. PATENT DOCUMENTS 3,088,909 A * 5/1963 Davison .................. C02F 1/265
                                                                     210/511
3,177,139 A * 4/1965 Kimberlin, Jr. ......... C02F 1/265
                                                                     423/181
(Continued)

FOREIGN PATENT DOCUMENTS

JP     2013-512092 A     4/2013
JP     2015-227265 A    12/2015
(Continued)

OTHER PUBLICATIONS

Oh Kyung Choi et al., "Interactions of water and salt with non-aqueous solvent in directional solvent desalination", Published by The 2018 World Congress on Advances in Civil, Environmental & Materials Research, Songdo Convensia, Incheon, Korea, Aug. 27-31, 2018. (Year: 2018).*
(Continued)

*Primary Examiner* — Joseph W Drodge
(74) *Attorney, Agent, or Firm* — Sughrue Mion, PLLC (57) ABSTRACT

Disclosed is a desalination apparatus using a solvent extraction scheme. The desalination apparatus using a solvent extraction scheme includes a source water supply module configured to supply source water including salt of a first concentration and water, a functional solvent supply module configured to supply a functional solvent, of which the
(Continued)

solubility in water varies according to temperature, a mixing module configured to mix the source water from the source water supply module and the functional solvent from the functional solvent supply module, a first separation module configured to receive mixture water, in which the source water and the functional solvent are mixed, from the mixing module, and dissolve the water contained in the source water in the functional solvent, a salt crystallization module configured to receive the source water including salt of a second concentration that is higher than the first concentration, from which the water has been removed, from the first separation module, and a second separation module configured to receive the functional solvent, in which the water has been dissolved, from the first separation module, and thermally separate the water and the functional solvent at a second temperature that is higher than the first temperature.

15 Claims, 5 Drawing Sheets (51) Int. Cl.
  B01D 9/00    (2006.01)
  C02F 1/52    (2023.01)
  C02F 103/08  (2006.01)
(52) U.S. Cl.
  CPC .. C02F 2001/5218 (2013.01); C02F 2103/08 (2013.01); C02F 2209/02 (2013.01); C02F 2305/14 (2013.01)
(58) Field of Classification Search
  CPC ...... C02F 1/02; C02F 1/22; C02F 1/26; C02F 1/52; B01D 9/00; B01D 9/0004; B01D 2009/0086; B01D 11/04; B01D 11/0488; B01D 17/0208; B01D 17/0211
  See application file for complete search history.

(56) References Cited

U.S. PATENT DOCUMENTS

| | | | | | |
|---|---|---|---|---|---|
| 3,314,882 | A | * | 4/1967 | Schroeder | C02F 1/265 203/10 |
| 3,823,000 | A | * | 7/1974 | Johnson | B01D 11/0488 423/580.1 |
| 5,679,254 | A | * | 10/1997 | Chakrabarti | C02F 1/265 203/DIG. 17 |
| 8,119,007 | B2 | * | 2/2012 | Bajpayee | C02F 1/265 210/642 |
| 9,428,404 | B2 | * | 8/2016 | Bajpayee | B01D 11/0492 |
| 2009/0045150 | A1 | * | 2/2009 | McCutchen | C02F 1/48 210/512.1 |
| 2011/0108481 | A1 | * | 5/2011 | Bajpayee | C02F 1/265 210/642 |
| 2012/0293186 | A1 | * | 11/2012 | Duval | G01N 27/06 324/649 |
| 2013/0082003 | A1 | * | 4/2013 | Bajpayee | B01D 11/0488 210/695 |
| 2014/0299520 | A1 | * | 10/2014 | Stemmle | B07C 3/082 209/509 |
| 2017/0107478 | A1 | * | 4/2017 | Harmon | C12M 21/04 |
| 2019/0084842 | A1 | * | 3/2019 | St. John | C02F 1/10 |

FOREIGN PATENT DOCUMENTS

| | | |
|---|---|---|
| JP | 2016-083640 A | 5/2016 |
| JP | 2016-087494 A | 5/2016 |
| KR | 10-2012-0108460 A | 10/2012 |
| KR | 10-1561925 B1 | 10/2015 |
| KR | 10-2017-0126097 A | 11/2017 |

OTHER PUBLICATIONS

Richard R. Davison et al., "Structure and Amine-Water Solubility in Desakination by Solvent Extraction", Journal of Chemical and Engineering Data, Oct. 1960, pp. 420-423, vol. 5, No. 4.
International Search Report for PCT/KR2019/005394 dated Aug. 7, 2019. [PCT/ISA/210].

* cited by examiner

DESALTING APPARATUS USING SOLVENT AND THE METHOD THEREOF

BACKGROUND OF THE INVENTION

1. Field of the Invention

The present disclosure relates to a desalination apparatus and a method thereof, and more particularly, to a desalination apparatus that extracts fresh water by using a functional solvent, of which the solubility in water varies according to temperature, a method thereof.

2. Description of the Prior Art

Climate changes expedite depletion of fresh water resources, such as surface water and underground water, which are currently used, in many areas, and increase interests in securing new water resources and using materials. Currently, more than 40% of the world populations experience lack of water, and it is expected that two thirds of the populations will suffer from water stress in 2025. In particular, Korea is classified as a water stress country as an annual precipitation per person is about one sixths of the world average, and most of the water resources depend on stream water and thus it is difficult to cope with lack of water due to abnormal drought and the like.

Currently, many countries have many interests in the technologies for desalinating seawater, in addition of inland fresh water, to secure water resources, and Korea also has made many efforts to develop seawater desalination technologies until a recent date. As the existing seawater desalination technologies, commercial technologies, such as distillation, reverse osmosis, and the like, have been mainly used. The treated water quality reference for industrial waste water also tends to become stricter, and when salt of a high concentration is present, reactions may be suppressed during biological treatments or physical/chemical treatments. In addition, in recent years, industrial waste water tends to be used as water for use through treatments, and various membrane technologies also are applied as in the seawater desalination. However, because most of the distillation and reverse osmosis technologies, which have been developed and commercialized conventionally, require high energy and high installation costs, demands for the development of low-energy type alternative technologies have recently been increased.

SUMMARY OF THE INVENTION

A technical objective of the present disclosure is to provide a desalination apparatus that improves desalination efficiency without using a pre-treatment process, and a method thereof.

Another technical objective of the present disclosure is to provide a desalination apparatus that remarkably decreases process energy consumption, and a method thereof.

Another technical objective of the present disclosure is to provide a desalination apparatus that remarkably decreases process costs, and a method thereof.

The technical objectives of the present disclosure are not limited to the above-described ones.

In order to solve the above-described objectives, the present disclosure provides a desalination apparatus using a solvent extraction scheme.

According to an embodiment, the desalination apparatus using a solvent extraction scheme may include a source water supply module configured to supply source water including salt of a first concentration and water, a functional solvent supply module configured to supply a functional solvent, of which the solubility in water varies according to temperature, a mixing module configured to mix the source water from the source water supply module and the functional solvent from the functional solvent supply module, a first separation module configured to receive mixture water, in which the source water and the functional solvent are mixed, from the mixing module, and dissolve the water contained in the source water in the functional solvent, a salt crystallization module configured to receive the source water including salt of a second concentration that is higher than the first concentration, from which the water has been removed, from the first separation module, and a second separation module configured to receive the functional solvent, in which the water has been dissolved, from the first separation module, and thermally separate the water and the functional solvent at a second temperature that is higher than the first temperature.

According to an embodiment, the functional solvent may include at least one of dipropylamine, ethylheptylamine, dibutylamine, and ethylbutylamine.

According to an embodiment, in the first separation module, the functional solvent may dissolve the water through hydrogen bonds with the water.

According to an embodiment, the mixing module may further include an agitator configured to agitate the source water and the functional solvent at a speed of 100 rpm to 500 rpm.

According to an embodiment, in the first separation module, the functional solvent, in which the water has been dissolved, and the source water, from which the water has been removed, may form water layers as the water contained in the source water is dissolved in the functional solvent, and the first separation module may further include a first partition wall that separates the water layers.

According to an embodiment, the density of the first partition wall may be higher than the density of the functional solvent, in which the water has been dissolved, and may be lower than the density of the source water, from which the water has been removed.

According to an embodiment, in the second separation module, the water and the functional solvent may form water layers, and the second separation module may further include a second partition wall that separates the water layers.

According to an embodiment, the density of the second partition wall may be higher than the density of the functional solvent and may be lower than the density of the water.

According to an embodiment, the desalination apparatus may further include a cooling module configured to provide cooling water that cools the salt crystallization module, and the salt crystallization module may further include seeds that crystallize the salt of the second concentration.

According to an embodiment, the desalination apparatus may further include a functional solvent recovery passage configured to supply the thermally separated functional solvent from the second separation module to the functional solvent supply module.

According to an embodiment, a heating module may be provided between the first separation module and the second separation module, and the heating module may increase the temperature of the functional solvent, in which the water supplied from the first separation module to the second separation module has been dissolved.

According to an embodiment, the desalination apparatus may further include a first heat exchanger configured to exchange heat between the functional solvent, in which the water from the first separation module has been dissolved, and the thermally separated functional solvent from the second separation module.

According to an embodiment, the desalination apparatus may further include a second heat exchanger configured to exchange heat between cooling water that has cooled the salt crystallization module and the functional solvent thermally separated from the second separation module and recovered to the functional solvent supply module.

In order to solve the above-described objectives, the present disclosure provides a desalination apparatus using a solvent extraction scheme.

According to an embodiment, the desalination method using a solvent extraction scheme may include an operation of supplying source water including salt of a first concentration and water and a functional solvent, of which the solubility in water varies according to temperature, an operation of mixing the source water and the functional solvent, a first separation operation of receiving mixture water, in which the source water and the functional solvent are mixed, and dissolving the water contained in the source water in the functional solvent at a first temperature, and a second separation operation of receiving the functional solvent, in which the water has been dissolved, and thermally separating the water and the functional solvent at a second temperature that is higher than the first temperature.

According to an embodiment, the desalination method may further include, after the first separation operation, an operation of receiving salt of a second concentration that is higher than the first concentration, from which the water has been removed, and crystallizing salt ions of the second concentration.

According to an embodiment, the functional solvent separated from the functional solvent, in which the water has been dissolved in the second separation operation may be reused in the operation of supplying the source water and the functional solvent.

The desalination apparatus using a solvent extraction scheme according to the embodiment of the present disclosure may include a source water supply module configured to supply source water including salt of a first concentration and water, a functional solvent supply module configured to supply a functional solvent, of which the solubility in water varies according to temperature, a mixing module configured to mix the source water from the source water supply module and the functional solvent from the functional solvent supply module, a first separation module configured to receive mixture water, in which the source water and the functional solvent are mixed, from the mixing module, and dissolve the water contained in the source water in the functional solvent, a salt crystallization module configured to receive the source water including salt of a second concentration that is higher than the first concentration, from which the water has been removed, from the first separation module, and a second separation module configured to receive the functional solvent, in which the water has been dissolved, from the first separation module, and thermally separate the water and the functional solvent at a second temperature that is higher than the first temperature. Accordingly, unlike an existing seawater desalination process that has performed desalination by using distillation or reverse osmosis, energy and costs that are consumed in an operation process may be significantly reduced as a pre-treatment process for seawater or energy for changing the phase of seawater to vapor are not necessary.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Hereinafter, preferred embodiments of the present disclosure will be described in detail with reference to the accompanying drawings. However, the technical spirit of the present disclosure is not limited to the embodiments, but may be realized in different forms. The embodiments introduced here are provided to sufficiently deliver the spirit of the present disclosure to those skilled in the art so that the disclosed contents may become thorough and complete.

When it is mentioned in the specification that one element is on another element, it means that the first element may be directly formed on the second element or a third element may be interposed between the first element and the second element. Further, in the drawings, the thicknesses of films and areas are exaggerated for efficient description of the technical contents.

Further, in the various embodiments of the present disclosure, the terms such as first, second, and third are used to describe various elements, but the elements are not limited to the terms. The terms are used only to distinguish one element from another element. Accordingly, an element mentioned as a first element in one embodiment may be mentioned as a second element in another embodiment. The embodiments illustrated here include their complementary embodiments. Further, the term "and/or" in the specification is used to include at least one of the elements enumerated in the specification.

In the specification, the terms of a singular form may include plural forms unless otherwise specified. In the specification, the terms "including" and "having" are used to designate that the features, the numbers, the steps, the elements, or combinations thereof described in the specification are present, and may be understood that one or more other features, numbers, step, elements, or combinations thereof may be added. Further, in the specification, "connected to" is used to mean a plurality of elements are indirectly or directly connected to each other.

Further, in the following description of the present disclosure, a detailed description of known functions and configurations incorporated herein will be omitted when it may make the subject matter of the present disclosure rather unclear.

Figure 1:
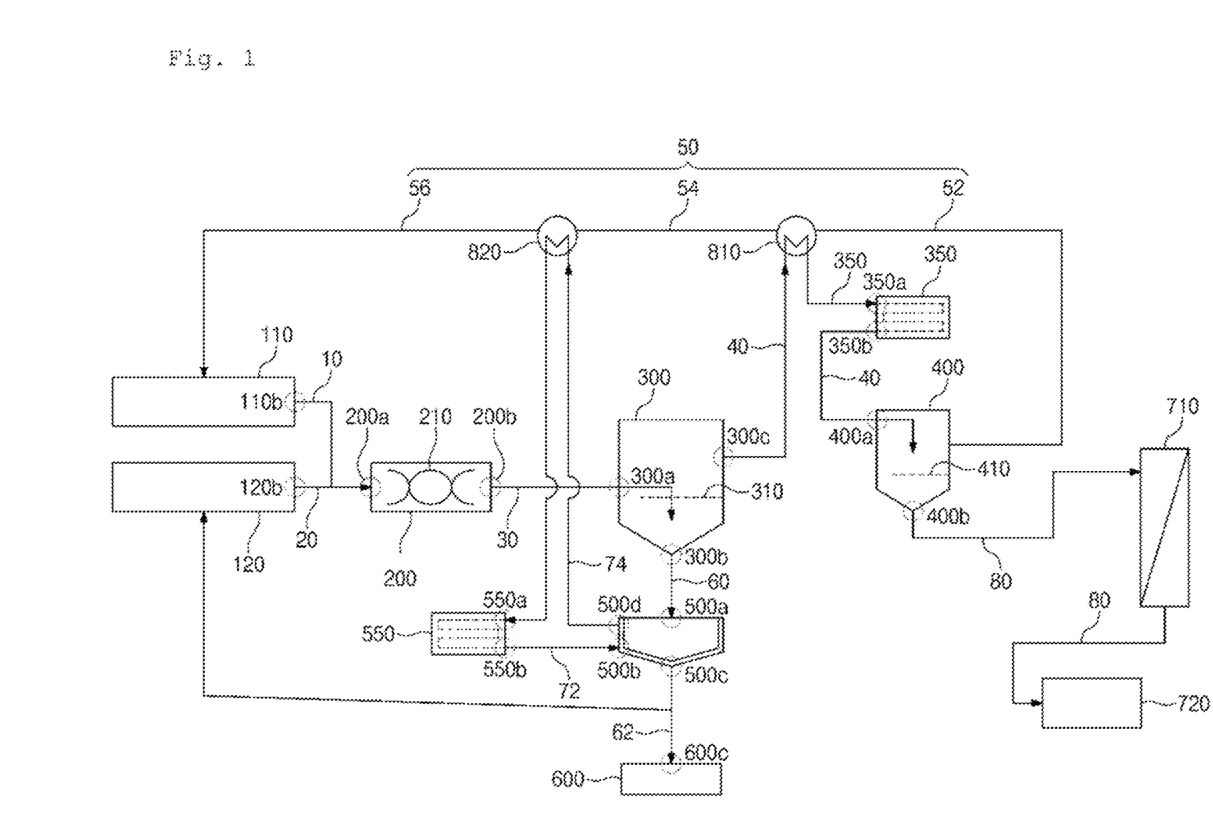
FIG. 1 is a view illustrating a desalination apparatus using a solvent extraction scheme according to an embodiment of the present disclosure.
Figure 2:
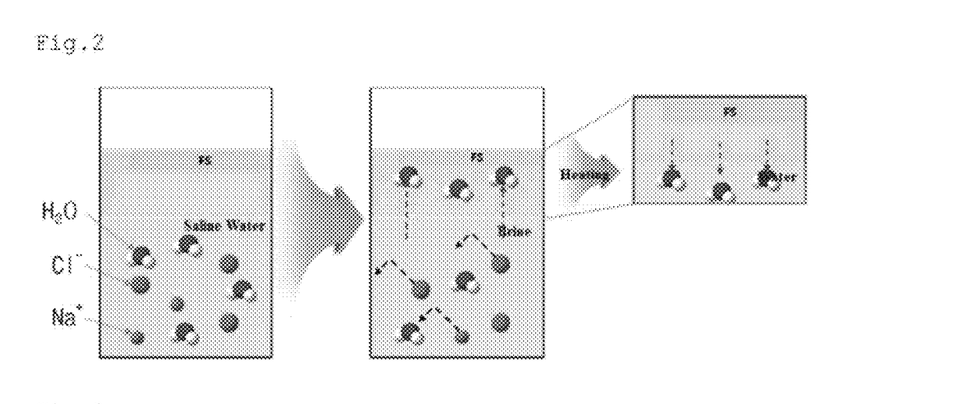
FIG. 2 is a view illustrating a fresh water extracting process performed by the desalination apparatus using a solvent extraction scheme according to the embodiment of the present disclosure.
Figure 3:
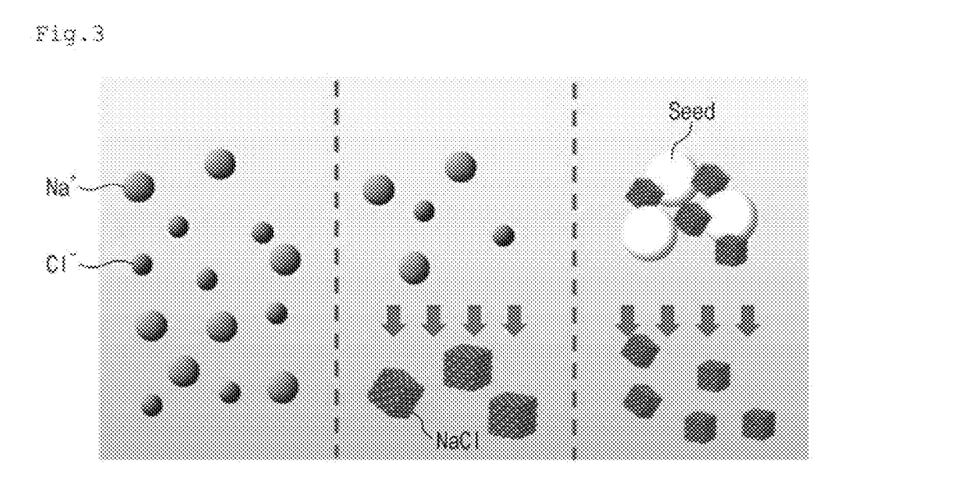
FIG. 3 is a view illustrating a salt concentrating process performed by the desalination apparatus using a solvent extraction scheme according to the embodiment of the present disclosure.

FIG. 1 is a view illustrating a desalination apparatus using a solvent extraction scheme according to an embodiment of the present disclosure. FIG. 2 is a view illustrating a fresh water extracting process performed by the desalination apparatus using a solvent extraction scheme according to the present disclosure. FIG. 3 is a view illustrating a salt concentrating process performed by the desalination apparatus using a solvent extraction scheme according to the embodiment of the present disclosure.

Referring to FIG. 1, the desalination apparatus using a solvent extraction scheme according to the embodiment of the present disclosure may include a functional solvent supply module 110, a source water supply module 120, a mixing module 200, a first separation module 300, a heating module 350, a second separation module 400, a salt crystallization module 500, a cooling module 550, a salt storage tank 600, a post-treatment module 710, a fresh water storage tank 720, a first heat exchanger 810, and a second heat exchanger 820. Hereinafter, the elements will be described in detail.

The source water supply module 120 may supply source water to the mixing module 130. According to the embodiment, the source water may include salt of a first concentration and water ($H_2O$). For example, the concentration of salt ions contained in the source water may be 0.2 M to 1.0 M. For example, the source water may be seawater, industrial waste water, and the like. Hereinafter, it will be assumed that the source water is seawater for convenience of description.

The source water may be discharged through a source water supply module outlet 120b. The source water supply module outlet 120b may be connected to one end of a source water supply passage 20. An opposite end of the source water supply passage 20 may be connected to the mixing module 130. That is, after being discharged through the source water supply module outlet 120b, the source water may be supplied to the mixing module 200 through the source water supply passage 20.

The functional solvent supply module 110 may supply a functional solvent to the mixing module 200. According to an embodiment, the solubility of the functional solvent in water may vary according to temperature. For example, the functional solvent may include at least one of dipropylamine, ethylheptylamine, dibutylamine, and ethylbutylamine.

The functional solvent may be discharged through a functional solvent supply module outlet 110b. The functional solvent supply module outlet 110b may be connected to one end of a functional solvent supply passage 10. An opposite end of the functional solvent supply passage 10 may be connected to the mixing module 200. That is, after being discharged through the functional solvent supply module outlet 110b, the functional solvent may be supplied to the mixing module 200 through the functional solvent supply passage 10.

The mixing module 200, as described above, may receive the source water and the functional solvent from the source water supply module 120 and the functional solvent supply module 110, respectively, to mix them. In detail, the mixing module 200 may receive the source water and the functional solvent through a mixing module inlet 200a.

According to the embodiment, the mixing module 200 may include an agitator 210. The agitator 210 may be disposed in the interior of the mixing module 200. The source water and the functional solvent may be mixed through the agitator 210. According to the embodiment, the speed of the agitator may be controlled. In detail, the speed of the agitator may be controlled to 100 rpm to 500 rpm. That is, the source water and the functional solvent may be mixed through the agitator operated at a speed of 100 rpm to 500 rpm. Unlike this, when the speed of the agitator is controlled to less than 100 rpm, the water contained in the source water may not be dissolved in the functional solvent in the first separation module 300, which will be described below. Meanwhile, when the speed of the agitator is controlled to more than 500 rpm, water layers may not be easily formed between the functional solvent, in which the water has been dissolved, and the source water, from which the water has been removed, in the first separation module 300, and thus, as a result, the crystallized salt ions may not be easily extracted.

The mixture water, in which the source water and the functional solvent are mixed, may be discharged a mixing module outlet 200b. The mixing module outlet 200b may be connected to one end of a mixture water supply passage 30. An opposite end of the mixture water supply passage 30 may be connected to the first separation module 300. That is, after being discharged through the mixing module outlet 200b, the mixture water may be supplied to the first separation module 300 through the mixture water supply passage 30.

The first separation module 300 may receive the mixture water from the mixing module 200. In detail, the first separation module 300 may receive the mixture water discharged from the mixing module 200 and provided along the mixture water supply passage 30, through a first separation module inlet 300a.

In the mixture water introduced into the first separation module 300, the water contained in the source water may be dissolved in the functional solvent. To achieve this, the first separation module 300 may maintain a first temperature. For example, the first temperature may be 15° C. to 30° C. As the water contained in the source water is dissolved in the functional solvent, the mixture water may be separated to the functional solvent, in which the water has been dissolved, and the source water, from which the water has been removed. The source water, from which the water has been removed, may include salt of a second concentration. The second concentration may be higher than the first concentration. A mechanism, in which the mixture water is separated to the functional solvent, in which the water has been dissolved, and the source water, from which the water has been removed, will be described in more detail with reference to FIG. 2.

Referring to FIG. 2, the mixture water, as illustrated in FIG. 2, may be in a state, in which the functional solvent FS and the source water (saline water) are mixed. When the mixture water is provided into the first separation module 300 having the first temperature, the functional solvent FS contained in the mixture water may dissolve the water through hydrogen bonds with the water ($H_2O$) contained in the source water. That is, the water molecules contained in the source water may travel from the source water to the functional solvent FS. Accordingly, the mixture water, as illustrated in FIG. 2, may be separated to the functional solvent, in which the water has been dissolved, and the source water (brine), from which the water has been removed. Furthermore, the source water, from which the water has been removed, may have a smaller amount of water as compared with the source water supplied from the source water supply module 120. Accordingly, the source water, from which the water has been removed, may include salt of a second concentration that is higher than the first concentration.

The functional solvent, in which the water has been dissolved, and the source water, from which the water has been removed, may form water layers. The functional solvent, in which the water has been dissolved, and the source water, from which the water has been removed, may be separated by the differences of densities and polarities thereof. In order to improve the separation efficiency of the functional solvent, in which the water has been dissolved, and the source water, from which the water has been removed, the first separation module may include a first partition wall 310. According to the embodiment, the density of the first partition wall 310 may be higher than the density of the functional solvent, in which the water has been dissolved, and may be lower than the density of the source water, from which the water has been removed. Accordingly, the first partition wall 310 may be disposed between the functional solvent, in which the water has been dissolved, and the source water, from which the water has been removed, to improve the separation efficiency of the functional solvent, in which the water has been dissolved, and the source water, from which the water has been removed.

The functional solvent, in which the water separated from the mixture water in the first separation module 300 has been dissolved, may be discharged through a first separation module solvent outlet 300*c*. The first separation module solvent outlet 300*c* may be connected to one end of a functional solvent supply passage 40 for the functional solvent, in which the water has been dissolved. An opposite end of the functional solvent supply passage 40 for the functional solvent, in which the water has been dissolved, may be connected to the second separation module 400. That is, after being discharged through the first separation module solvent outlet 300*c*, the functional solvent, in which the water has been dissolved, may be supplied to the second separation module 400 through the functional solvent supply passage 40.

The source water, from which the water separated from the mixture water in the first separation module 300 has been removed, may be discharged through a first separation module source water outlet 300*b*. The first separation module source water outlet 300*b* may be connected to one end of the source water supply passage 60 for the source water, from which the water has been removed. An opposite end of the source water supply passage 60 for the source water, from which the water has been removed, may be connected to the salt crystallization module 500. That is, after being discharged through the first separation module source water outlet 300*b*, the source water, from which the water has been removed, may be supplied to the salt crystallization module 500 through the source water supply passage 60 for the source water, from which the water has been removed.

The second separation module 400 may receive the functional solvent, in which the water has been dissolved, from the first separation module 300. In detail, the second separation module 400 may be discharged from the first separation module 300 to receive the functional solvent, in which the water has been dissolved, provided along the functional solvent supply passage 40 for the functional solvent, in which the water has been dissolved, through a second separation module inlet 400*a*.

The functional solvent, in which the water introduced into the second separation module 400 has been dissolved, may be separated to the water and the functional solvent. The separation of the functional solvent, in which the water has been dissolved, may be performed at a second temperature. The second temperature may be higher than the first temperature. For example, the second temperature may be 60° C. to 80° C. A mechanism for separating the water and the functional solvent from the functional solvent, in which the water has been dissolved, will be described in more detail with reference to FIG. 2.

Referring to FIG. 2, as described above, the solubility of the functional solvent in the water may vary according to temperature. Accordingly, when the functional solvent, in which the water has been dissolved, is heat-treated at the second temperature that is higher than the first temperature, the solubility of the functional solvent in the water may vary. In detail, the solubility of the functional solvent in the water when the functional solvent, in which the water has been dissolved, is heat-treated at the second temperature, may be decreased as compared with the solubility of the functional solvent in the water, which is contained in the mixture water provided into the first separation module 300 having the first temperature. As a result, when the functional solvent, in which the water has been dissolved, is heat-treated at the second temperature, the solubility of the functional solvent in the water is relatively decreased so that the water may be separated from the functional solvent, in which the water has been dissolved.

The water and the functional solvent may form water layers. The water and the functional solvent may be separated by the differences of the densities and the polarities thereof. In order to improve the separation efficiency of the water and the functional solvent, the second separation module may include a second partition wall 410. According to the embodiment, the density of the second partition wall 410 may be higher than the density of the functional solvent and lower than the density of the water. Accordingly, the second partition wall 410 may be disposed between the functional solvent and the water to improve the separation efficiency of the functional solvent and the water.

The heating module 350 may increase the temperature of the functional solvent, in which the water discharged from the first separation module 300 has been dissolved. The functional solvent, in which the water, the temperature of which has been increased by the heating module 350, has been dissolved, may be provided to the second separation module 400. In more detail, the heating module 350 may increase the temperature of the functional solvent, in which the water discharged from the first separation module 300 has been dissolved, to the second temperature. To achieve this, the heating module 350 may be disposed between the first separation module 300 and the second separation module 400.

The salt crystallization module 500 may receive the source water, from which the water has been removed, from the first separation module 300. In detail, the salt crystallization module 500 may receive the source water discharged from the first separation module 300 and, from which the water provided along the source water supply passage 60 from the source water, from which the water has been removed, through a first salt crystallization module outlet 500a.

The salt ions in the source water, from which the water introduced into the salt crystallization module 500 has been removed, may be crystallized and the salt crystals may be extracted. The crystallization of the salt ions may be performed through a method for providing seeds after the source water, from which the water has been removed, is cooled. The seeds may crystallize the salt of the second concentration contained in the source water, from which the water has been removed. For example, the seeds may be biochar, sand, and the like. A mechanism for crystallizing the salt ions in the source water, from which the water has been removed, will be described in more detail with reference to FIG. 3.

Referring to FIG. 3, in the source water, from which the water introduced into the salt crystallization module 500 has been removed, as illustrated in FIG. 3, a plurality of sodium ions ($Na^+$) and a plurality of chloride ions ($Cl^-$) may be disposed in the water to be spaced apart from each other. Thereafter, when the source water, from which the water has been removed, is cooled, the sodium ions ($Na^+$) and the chloride ions ($Cl^-$) are coupled to each other to form sodium chloride (NaCl) salt ions as illustrated in FIG. 3. The chloride ions, as illustrated in FIG. 3, may be crystallized by the seeds.

Referring to FIG. 1 again, the cooling module 550 may provide the cooling water to the salt crystallization module 500. According to the embodiment, the cooling water may circulate along the outside of the salt crystallization module 500. Accordingly, the source water, from which the water introduced into the salt crystallization module 500 has been removed, may be cooled.

According to the embodiment, the cooling module 550 may include a cooling water inlet 500a and a cooling water outlet 500b. The cooling water outlet 500b may be connected to one end of a cooling water supply passage 72. An opposite end of the cooling water supply passage 72 may be connected to a second salt crystallization module inlet 500b. Accordingly, the cooling water discharged from the cooling module 550 may be supplied to the salt crystallization module 500 through the cooling water supply passage 72. After circulating along the outside of the salt crystallization module 500, the cooling water supplied to the salt crystallization module 500 may be discharged through a second salt crystallization module outlet 500d. The second salt crystallization module outlet 500d may be connected to one end of a cooling water discharge passage 74. An opposite end of the cooling water discharge passage 74 may be connected to the cooling water inlet 500a. Accordingly, the cooling water discharged from the salt crystallization module 500 may be supplied to the cooling module 550 through the cooling water discharge passage 74. That is, after being discharged from the cooling module 550, the cooling water may circulate to be introduced into the cooling module 550 again via the cooling water supply passage 72, the salt crystallization module 500, and the cooling water discharge passage 74.

The salt storage tank 600 may receive the crystallized salt ions from the salt crystallization module 500. In detail, after being discharged to a first salt crystallization module outlet 500c, the salt ions separated from the source water, from which the water has been removed, and crystallized by the salt crystallization module 500 may be introduced into a salt storage tank inlet 600c through a crystallized salt ion supply passage 62. The salt storage tank 600 may store the provided crystallized salt ions.

The source water, from which the crystallized salt ions have been extracted, may be provided to the source water supply module 120 through a source water recovery passage (not illustrated). The source water recovery passage (not illustrated) may connect the salt crystallization module 500 and the source water supply module 120. That is, the source water, from which the water provided to the salt crystallization module 500 has been removed, may be separated salt ions and the source water, from which the crystallized salt ions have been extracted. In this case, the crystallized salt ions may travel to the salt storage tank 600 and be stored in the interior of the salt storage tank 600 and the source water, from which the crystallized salt ions have been extracted, may travel to the source water supply module 120 to be recycled as the source water supplied to the mixing module 200.

Subsequently, referring to FIG. 1, the post-treatment module 710 may receive the water from the second separation module 400. In detail, the post-treatment module 710 may be discharged from the second separation module 400, and may be provided with the water provided along the fresh water supply passage 80. The post-treatment module 710 may remove the marginal functional solvent contained in the water. For example, the post-treatment module 710 may remove the marginal functional solvent contained in the water by using biochar, sand, and the like. Thereafter, the water, from which the functional solvent has been removed, may be provided to and stored in the fresh water storage tank 720.

The functional solvent thermally separated from the second separation module 400 may be recovered to the functional solvent supply module 110 through a functional solvent recovery passage 50. To achieve this, the functional solvent recovery passage 50 may connect the second separation module 400 and the functional solvent supply module 110. That is, one end of the functional solvent recovery passage 50 may be connected to the second separation module 400, and an opposite end of the functional solvent recovery passage 50 may be connected to the functional solvent supply module 110.

According to an embodiment, the functional solvent recovery passage 50 may include first to third functional solvent recovery passages 52, 54, and 56. The first functional solvent recovery passage 52 may connect the second separation module 400 and the first heat exchanger 810. The second functional solvent recovery passage 54 may connect the first heat exchanger 810 and the second heat exchanger 820. The third functional solvent recovery passage 56 may connect the second heat exchanger 820 and the functional solvent supply module 110. That is, the first functional solvent recovery passage 52, the first heat exchanger 810, the second functional solvent recovery passage 54, the second heat exchanger 820, and the third functional solvent recovery passage 56 may be disposed between the second separation module 400 and the functional solvent supply module 110.

The first heat exchanger 810 may exchange heat between the functional solvent, in which the water discharged from the first separation module 300 has been dissolved, and the functional solvent thermally separated from the second separation module 400. In detail, the first heat exchanger 810 may transfer heat from the thermally separated functional solvent that travels through the first functional solvent recovery passage 52 to the functional solvent, in which the water has been dissolved, which travels through the functional solvent supply passage 40 for the functional solvent, in which the water has been dissolved.

The thermally separated functional solvent that travels through the first functional solvent recovery passage 52 may be in a state in which it is heated by the heating module 350. Meanwhile, the functional solvent, in which the water has been dissolved, which travels through the functional solvent supply passage 40 for the functional solvent, in which the water has been dissolved, may be a state before it is heated by the heating module 350. For example, the temperature of the thermally separated functional solvent that travels through the first functional solvent recovery passage 52 may be 60° C. to 80° C. Meanwhile, the temperature of the functional solvent, in which the water has been dissolved, which travels through the functional solvent supply passage 40 for the functional solvent, in which the water has been dissolved, may be 15° C. to 30° C. Accordingly, the first heat exchanger 810 may transfer heat from the thermally separated functional solvent that travels through the first functional solvent recovery passage 52 having a high temperature to the functional solvent, in which the water has been dissolved, which travels through the functional solvent supply passage 40 having a low temperature for the functional solvent, in which the water has been dissolved.

As a result, as the first heat exchanger 810 increases the temperature of the functional solvent, in which the water in a state before it is heated by the heating module 350 has been dissolved, consumption of energy for increasing the temperature of the functional solvent, in which the water has been dissolved, by the heating module 350 may be reduced. That is, the first heat exchanger 810 may improve the energy efficiency of the heating module 350.

The second heat exchanger 820 may exchange heat between the cooling water that cooled the salt crystallization module 500, and the functional solvent thermally separated from the second separation module 400 and recovered to the functional solvent supply module 110. In detail, the second heat exchanger 820 may transfer heat from the thermally separated functional solvent that travels through the second functional solvent recovery passage 54 to the cooling water that travels through the cooling water discharge passage 74.

The temperature of the thermally separated functional solvent that travels through the second functional solvent recovery passage 54 may be higher than the temperature of the cooling water that travels through the cooling water discharge passage 74. Accordingly, the second heat exchanger 820 may transfer heat from the thermally separated functional solvent that travels through the second functional solvent recovery passage 54 having a high temperature to the cooling water that travels through the cooling water discharge passage 74 having a low temperature.

As a result, the second heat exchanger 820 may decrease the temperature of the thermally separated functional solvent recovered to the functional solvent supply module 110. Accordingly, the second heat exchanger 820 may improve the energy efficiencies of the functional solvent supply module 110 and the mixing module 200 by decreasing the temperature of the functional solvent provided from the functional solvent supply module 110 to the mixing module 200.

The desalination apparatus using a solvent extraction scheme according to the embodiment of the present disclosure may include a source water supply module 120 configured to supply source water including salt of a first concentration and water, a functional solvent supply module 110 configured to supply a functional solvent, of which the solubility in water varies according to temperature, a mixing module 200 configured to mix the source water from the source water supply module 120 and the functional solvent from the functional solvent supply module 110, a first separation module 300 configured to receive mixture water, in which the source water and the functional solvent are mixed, from the mixing module, and dissolve the water contained in the source water in the functional solvent, a salt crystallization module 500 configured to receive the source water including salt of a second concentration that is higher than the first concentration, from which the water has been removed, from the first separation module 300, and a second separation module 400 configured to receive the functional solvent, in which the water has been dissolved, from the first separation module 300, and thermally separate the water and the functional solvent at a second temperature that is higher than the first temperature. Accordingly, unlike an existing seawater desalination process that has performed desalination by using distillation or reverse osmosis, energy and costs that are consumed in an operation process may be significantly reduced as a pre-treatment process for seawater or energy for changing the phase of seawater to vapor are not necessary.

Until now, the desalination apparatus using a solvent extraction scheme according to the embodiment of the present disclosure has been described. Hereinafter, a desalination method using a solvent extraction scheme according to an embodiment of the present disclosure will be described.

Figure 4:
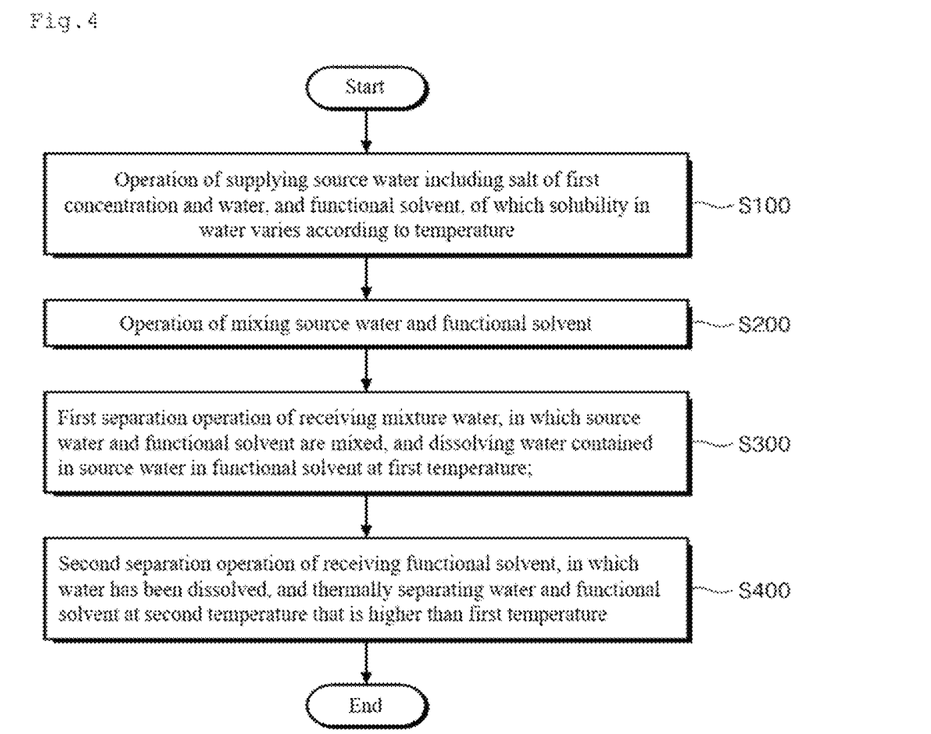
FIG. 4 is a flowchart illustrating a desalination method using a solvent extraction scheme according to an embodiment of the present disclosure.

FIG. 4 is a flowchart illustrating a desalination method using a solvent extraction scheme according to an embodiment of the present disclosure.

Referring to FIG. 4, the desalination method using a solvent extraction scheme according to the embodiment may include an operation S100 of supplying source water and a functional solvent, an operation S200 of mixing the source water and the functional solvent, a first separation operation S300, and a second separation operation S400. Hereinafter, the respective operations will be described. Furthermore, it is apparent that the desalination method using a solvent extraction scheme according to the embodiment may be performed by the desalination apparatus using a solvent extraction scheme according to the embodiment, which has been described with reference to FIG. 1.

In the operation S100, the source water and the functional solvent may be supplied to the mixing module. According to the embodiment, the source water may include salt of a first concentration and water ($H_2O$). For example, the concentration of salt ions contained in the source water may be 0.2 M to 1.0 M. For example, the source water may be seawater, industrial waste water, and the like. The solubility of the functional solvent in water may vary according to temperature. For example, the functional solvent may include at least one of dipropylamine, ethylheptylamine, dibutylamine, and ethylbutylamine.

In the operation S200, the source water and the functional solvent may be mixed. According to the embodiment, the source water and the functional solvent may be mixed through the agitator operated at a speed of 100 rpm to 500 rpm. Unlike this, when the speed of the agitator is controlled to less than 100 rpm, the water contained in the source water may not be dissolved in the functional solvent in the operation S300, which will be described below. Meanwhile, when the speed of the agitator is controlled to more than 500 rpm, water layers may not be easily formed between the functional solvent, in which the water has been dissolved, and the source water, from which the water has been removed, in the first separation operation S300 and thus, as a result, the crystallized salt ions may not be easily extracted.

In the operation S300, the mixture water, in which the source water and the functional solvent are mixed, may be provided, and the water contained in the source water may be dissolved in the functional solvent at a first temperature. As the water contained in the source water is dissolved in the functional solvent, the mixture water may be separated to the functional solvent, in which the water has been dissolved, and the source water, from which the water has been removed. The source water, from which the water has been removed, may include salt of a second concentration. The second concentration may be higher than the first concentration.

That is, the mixture water, in which the functional solvent and the source water are mixed, is provided to an environment having the first temperature, the functional solvent may dissolve the water through hydrogen bonds with water $H_2O$ contained in the source water. That is, the water molecules contained in the source water may travel from the source water to the functional solvent. Accordingly, the mixture water may be separated to the functional solvent, in which the water has been dissolved, and the source water, from which the water has been removed.

The functional solvent, in which the water has been dissolved, and the source water, from which the water has been removed, may form water layers. The functional solvent, in which the water has been dissolved, and the source water, from which the water has been removed, may be separated by the differences of densities and polarities thereof.

In the operation S400, the functional solvent, in which the water has been dissolved, may be provided, and the water and the functional solvent may be thermally separated at a second temperature that is higher than the first temperature. That is, the functional solvent, in which the water has been dissolved, may be thermally treated to the second temperature and may be separated to the water and the functional solvent. For example, the second temperature may be 60° C. to 80° C.

As described above, the solubility of the functional solvent in water may vary according to temperature. Accordingly, when the functional solvent, in which the water has been dissolved, is heat-treated at the second temperature that is higher than the first temperature, the solubility of the functional solvent in the water may vary. In detail, the solubility of the functional solvent in the water when the functional solvent, in which the water has been dissolved, is heat-treated at the second temperature, may be decreased as compared with the solubility of the functional solvent in the water, which is contained in the mixture water provided to the environment of the first temperature in the operation S300. As a result, when the functional solvent, in which the water has been dissolved, is heat-treated at the second temperature, the solubility of the functional solvent in the water is relatively decreased so that the water may be separated from the functional solvent, in which the water has been dissolved. The water and the functional solvent may form water layers. The water and the functional solvent may be separated by the differences of the densities and the polarities thereof. The functional solvent thermally separated in the second separation operation S400 may be recovered and may be reused in the operation S100.

The desalination apparatus according to the embodiment may further include, after the first separation operation S300, an operation of crystallizing salt ions of a second concentration. In detail, the operation of crystallizing the salt ions of the second concentration may be performed through a scheme of receiving the source water, from which the water separated in the first separation operation has been removed, cooling the source water, and providing seeds. For example, the seeds may be biochar, sand, and the like. A detailed mechanism for crystallizing the salt ions may be the same as the mechanism for crystallizing salt ions, which is performed in the salt crystallization module described with reference to FIG. 3. Accordingly, a detailed description thereof will be omitted.

The salt ions crystallized in the operation of crystallizing the salt ions of the second concentration may be stored in the storage tank. Meanwhile, the source water, from which the salt ions crystallized in the operation of crystallizing the salt ions of the second concentration may be recovered, and may be reused in the operation S100.

Until now, the desalination apparatus and the desalination method using a solvent extraction scheme according to the embodiment of the present disclosure have been described. Hereinafter, detailed experimental examples and characteristic evaluation results of the desalination apparatus and the desalination method using a solvent extraction scheme according to the embodiments of the present disclosure will be described.

Figure 5:
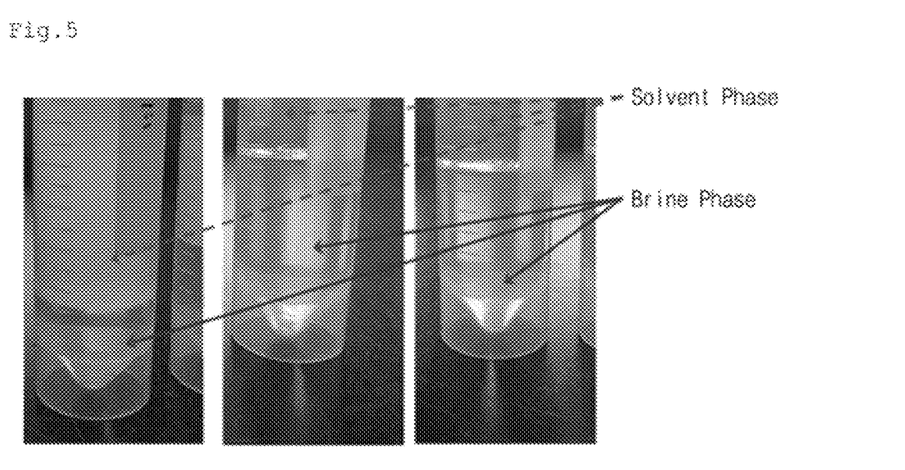
FIG. 5 illustrates pictures for comparing the characteristics of functional solvents used in the desalination apparatus using a solvent extraction scheme according to the embodiment of the present disclosure.
Figure 6:
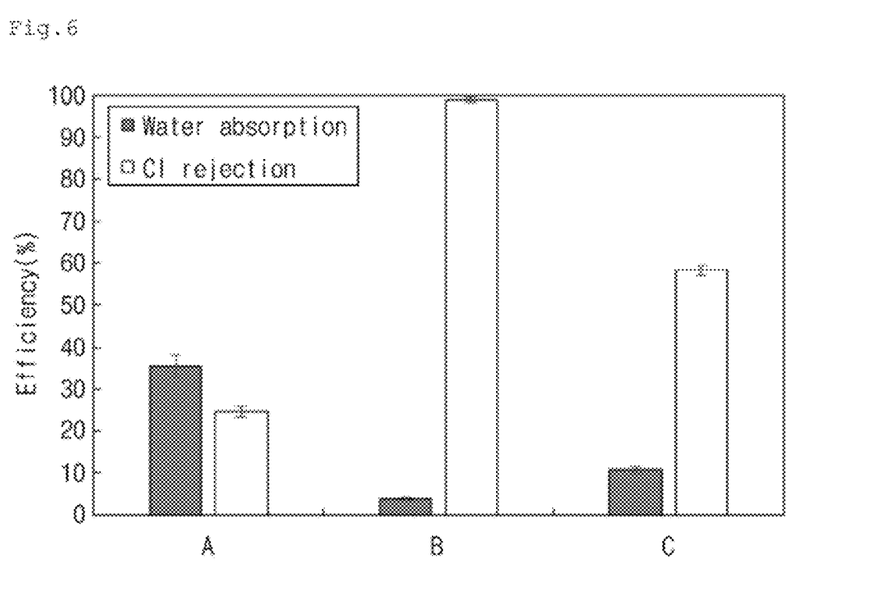
FIG. 6 illustrates a graph for comparing the characteristics of functional solvents used in the desalination apparatus using a solvent extraction scheme according to the embodiment of the present disclosure.

FIG. 5 illustrates pictures for comparing the characteristics of functional solvents used in the desalination apparatus using a solvent extraction scheme according to the embodiment of the present disclosure. FIG. 6 illustrates a graph for comparing the characteristics of functional solvents used in the desalination apparatus using a solvent extraction scheme according to the embodiment of the present disclosure.

Referring to FIG. 5, after different functional solvents A to C were prepared and the functional solvents A to C were mixed with source water containing NaCl of a concentration of 0.5 M, states, in which the functional solvents and the source water were mixed, were photographed and are illustrated in FIG. 5. The functional solvent A was octylamine, the functional solvent B was dibutylamine, and the functional solvent C was 2-ethylhexylamine.

As can be seen from FIG. 5, it could be identified that when the functional solvents A to C were mixed with the source water, all of the functional solvents A to C formed a solvent phase and a brine phase. It is determined that this is because the water contained in the source water containing NaCl of a concentration of 0.5 M was dissolved in the functional solvents A to C, and the phases were classified into the solvent phase, in which the functional solvent and the water were mixed, and the brine phase, in which the water was removed from the source water.

Referring to FIG. 6, after different functional solvents A to C were prepared and the functional solvents A to C were mixed with source water containing NaCl of a concentration of 0.5 M, the water absorptions (%) and the Cl rejections (%) of the functional solvents A to C were measured and are illustrated. For the water absorptions, the moisture content of the solvent phase when the functional solvent and the source water were mixed to form water layers was measured. The Cl rejections were calculated through Formula 1.

$$\frac{\text{Residual mass of Cl}^- \text{ in the brine}}{\text{Initial mass of Cl}^- \text{ in the saline water}} \times 100 \quad \langle\text{Formula 1}\rangle$$

As can be seen from FIG. 6, it was shown that the water absorption of the functional solvent A is the highest but it was shown that the Cl rejection of the functional solvent B is the highest. It is determined that it is difficult to apply the functional solvent A (octylamine) to the desalination apparatus using a solvent extraction scheme according to the embodiment as its water absorption is high but its Cl rejection is low. Meanwhile, it is determined that it is suitable to apply the functional solvent B (dibutylamine) to the desalination apparatus using a solvent extraction scheme according to the embodiment as its water absorption is relatively low but its Cl rejection is remarkably high.

Figure 7:
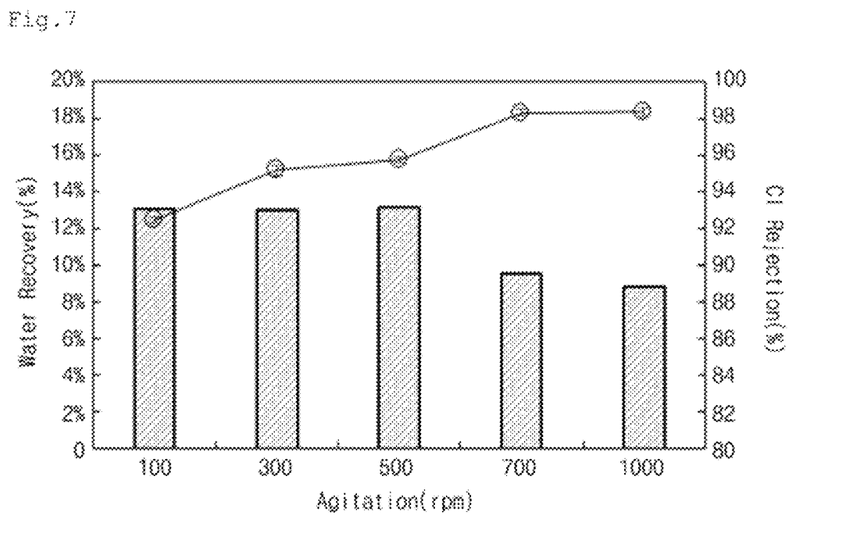
FIG. 7 illustrates a graph for comparing changes in characteristics according to the speeds of an agitator included in a mixing module of the desalination apparatus using a solvent extraction scheme according to the embodiment of the present disclosure.

FIG. 7 illustrates a graph for comparing changes in characteristics according to the speeds of an agitator included in a mixing module of the desalination apparatus using a solvent extraction scheme according to the embodiment of the present disclosure.

Referring to FIG. 7, the speeds of an agitator included in the mixing module of the desalination apparatus using a solvent extraction scheme according to the embodiment were controlled to 100 rpm, 300 rpm, 500 rpm, 700 rpm, and 1000 rpm and the water recoveries (%) and the Cl rejections (%) for the cases were measured. The water recoveries and the Cl rejections were calculated as described in FIG. 6. The results of the graph illustrated in FIG. 7 are summarized through Table 1.

TABLE 1

| Category | Water recovery (%) | Cl rejection (%) |
|---|---|---|
| 100 rpm | 12.43 | 93.04 |
| 300 rpm | 15.13 | 92.97 |
| 500 rpm | 15.73 | 93.15 |
| 700 rpm | 18.31 | 89.53 |
| 1000 rpm | 18.35 | 88.83 |

As can be seen from FIG. 7 and Table 1, it could be identified that the Cl rejections were scarcely different when the speeds of the agitator is 100 rpm, 300 rpm, and 500 rpm, but the Cl rejections were significantly decreased at 700 rpm and 1000 rpm. It is determined that this is because, as described with reference to FIG. 1, water layers were not easily formed between the functional solvent, in which the water had been dissolved, and the source water, from which the water had been removed, when the agitation speed is two high. That is, it can be identified that, when the desalination apparatus using a solvent extraction scheme according to the embodiment is used, the speed of the agitator included in the mixing module needs to be controlled to 100 rpm to 500 rpm.

Figure 8:
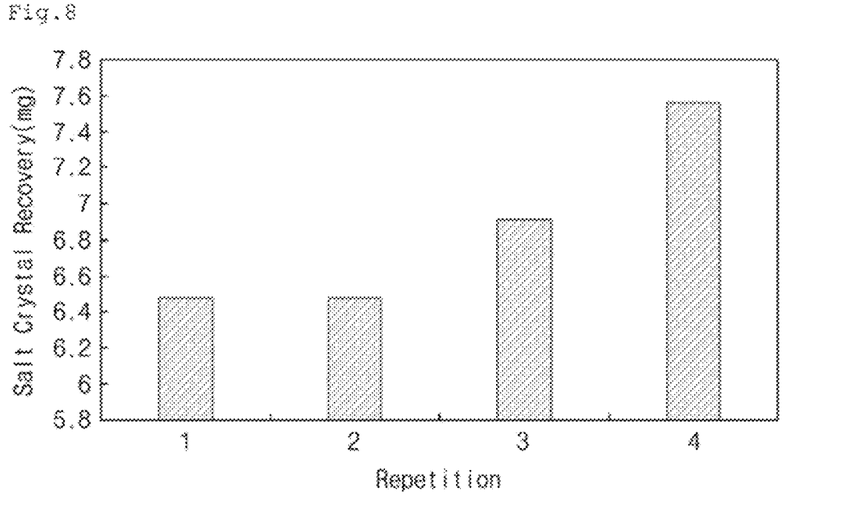
FIG. 8 illustrates a graph for comparing characteristics according to the number of reuses of source water separated from a salt crystallization module included in the desalination apparatus using a solvent extraction scheme according to the embodiment of the present disclosure.

FIG. 8 illustrates a graph for comparing characteristics according to the number of reuses of source water separated from a salt crystallization module included in the desalination apparatus using a solvent extraction scheme according to the embodiment of the present disclosure.

Referring to FIG. 8, the weight (salt recovery, mg) of the crystallized salt ions acquired from the salt crystallization module (repetition 1) included in the desalination apparatus using a solvent extraction scheme according to the embodiment, the weight of the crystallized salt ions acquired by reusing (repetition 2) the source water separated from the salt crystallization module included in the desalination apparatus using a solvent extraction scheme according to the embodiment, the weight of the crystallized salt ions acquired by reusing (repetition 3) two times the source water separated from the salt crystallization module included in the desalination apparatus using a solvent extraction scheme according to the embodiment, and the weight of the crystallized salt ions acquired by reusing (repetition 4) three times the source water separated from the salt crystallization module included in the desalination apparatus using a solvent extraction scheme according to the embodiment were measured and are illustrated. The results of the graph illustrated in FIG. 8 are summarized through Table 2.

TABLE 2

| Category | Repetition 1 | Repetition 2 | Repetition 3 | Repetition 4 |
|---|---|---|---|---|
| Salt recovery | 6.48 | 6.48 | 6.91 | 7.56 |

As can be seen through FIG. 8 and Table 2, it could be identified that in the desalination apparatus using a solvent extraction scheme according to the embodiment, the concentration of the salt ions increased as the number of reuses of the source water separated from the salt crystallization module increased, and thus the weight of the salt ions also increased.

After mixing the functional solvent, of which the solubility in water varies according to temperature, with the source water, the desalination apparatus using a solvent extraction scheme according to the embodiment of the present disclosure may derive the solubilities of the functional solvents in the source water through changes in temperature. Accordingly, fresh water may be acquired by removing salt ions from the source water. Accordingly, unlike an existing seawater desalination process that has performed desalination by using distillation or reverse osmosis, energy and costs that are consumed in an operation process may be significantly reduced as a pre-treatment process for seawater or energy for changing the phase of seawater to vapor are not necessary.

Although the preferred embodiments of the present disclosure have been described in detail until now, the scope of the present disclosure is not limited to the embodiments and should be construed by the attached claims. Further, it should be understood that those skilled in the art to which the present disclosure pertains may variously correct and modify the present disclosure without departing from the scope of the present disclosure.

What is claimed is:

1. A desalination apparatus using a solvent extraction scheme, the desalination apparatus comprising:
   a source water supply module configured to supply first source water comprising salt of a first concentration and water;
   a functional solvent supply module configured to supply a functional solvent of which solubility in water varies according to temperature;
   a mixing module configured to generate mixture water by mixing the first source water and the functional solvent;
   a first separation module configured to receive the mixture water from the mixing module and dissolve the water contained in the first source water in the functional solvent at a first temperature;
   a salt crystallization module configured to receive, from the first separation module, second source water comprising salt of a second concentration that is higher than the first concentration, the second source water being the first source water from which the water has been removed; and
   a second separation module configured to receive the functional solvent in which the water has been dissolved, from the first separation module, and thermally separate the water and the functional solvent at a second temperature that is higher than the first temperature, wherein in the first separation module, the functional solvent in which the water has been dissolved, and the first source water from which the water has been removed, form water layers as the water contained in the first source water is dissolved in the functional solvent, and wherein the first separation module further comprises a partition wall that separates the water layers.

2. The desalination apparatus of claim 1, wherein the functional solvent comprises at least one of dipropylamine, ethylheptylamine, dibutylamine, or ethylbutylamine.

3. The desalination apparatus of claim 1, wherein in the first separation module, the functional solvent dissolves the water through hydrogen bonding with the water.

4. The desalination apparatus of claim 1, wherein the mixing module further comprises an agitator configured to agitate the first source water and the functional solvent at a speed of 100 rpm to 500 rpm.

5. The desalination apparatus of claim 1, wherein a density of the partition wall is higher than a density of the functional solvent in which the water has been dissolved, and is lower than a density of the first source water from which the water has been removed.

6. A desalination apparatus using a solvent extraction scheme, the desalination apparatus comprising:
a source water supply module configured to supply first source water comprising salt of a first concentration and water;
a functional solvent supply module configured to supply a functional solvent of which solubility in water varies according to temperature;
a mixing module configured to generate mixture water by mixing the first source water and the functional solvent;
a first separation module configured to receive the mixture water from the mixing module and dissolve the water contained in the first source water in the functional solvent at a first temperature;
a salt crystallization module configured to receive, from the first separation module, second source water comprising salt of a second concentration that is higher than the first concentration, the second source water being the first source water from which the water has been removed; and
a second separation module configured to receive the functional solvent in which the water has been dissolved, from the first separation module, and thermally separate the water and the functional solvent at a second temperature that is higher than the first temperature,
wherein in the first and second separation modules, the water and the functional solvent form water layers, and
wherein the second separation module further comprises a partition wall that separates the water layers.

7. The desalination apparatus of claim 6, wherein a density of the partition wall is higher than a density of the functional solvent and is lower than a density of the water.

8. A desalination apparatus using a solvent extraction scheme, the desalination apparatus comprising:
a source water supply module configured to supply first source water comprising salt of a first concentration and water;
a functional solvent supply module configured to supply a functional solvent of which solubility in water varies according to temperature;
a mixing module configured to generate mixture water by mixing the first source water and the functional solvent;
a first separation module configured to receive the mixture water from the mixing module and dissolve the water contained in the first source water in the functional solvent at a first temperature;
a salt crystallization module configured to receive, from the first separation module, second source water comprising salt of a second concentration that is higher than the first concentration, the second source water being the first source water from which the water has been removed;
a second separation module configured to receive the functional solvent in which the water has been dissolved, from the first separation module, and thermally separate the water and the functional solvent at a second temperature that is higher than the first temperature; and
a cooling module configured to provide cooling water that cools the salt crystallization module,
wherein the salt crystallization module further comprises seeds that crystallize the salt of the second concentration, and
wherein the first separation module is configured to separate the mixture water into layers.

9. A desalination apparatus using a solvent extraction scheme, the desalination apparatus comprising:
a source water supply module configured to supply first source water comprising salt of a first concentration and water;
a functional solvent supply module configured to supply a functional solvent of which solubility in water varies according to temperature;
a mixing module configured to generate mixture water by mixing the first source water and the functional solvent;
a first separation module configured to receive the mixture water from the mixing module and dissolve the water contained in the first source water in the functional solvent at a first temperature;
a salt crystallization module configured to receive, from the first separation module, second source water comprising salt of a second concentration that is higher than the first concentration, the second source water being the first source water from which the water has been removed; and
a second separation module configured to receive the functional solvent in which the water has been dissolved, from the first separation module, and thermally separate the water and the functional solvent at a second temperature that is higher than the first temperature; and
a functional solvent recovery passage configured to supply the thermally separated functional solvent from the second separation module to the functional solvent supply module;
wherein the first separation module is configured to separate the mixture water into layers.

10. A desalination apparatus using a solvent extraction scheme, the desalination apparatus comprising:
a source water supply module configured to supply first source water comprising salt of a first concentration and water;

a functional solvent supply module configured to supply a functional solvent of which solubility in water varies according to temperature;

a mixing module configured to generate mixture water by mixing the first source water and the functional solvent;

a first separation module configured to receive the mixture water from the mixing module and dissolve the water contained in the first source water in the functional solvent at a first temperature;

a salt crystallization module configured to receive, from the first separation module, second source water comprising salt of a second concentration that is higher than the first concentration, the second source water being the first source water from which the water has been removed; and a second separation module configured to receive the functional solvent in which the water has been dissolved, from the first separation module, and thermally separate the water and the functional solvent at a second temperature that is higher than the first temperature, wherein a heating module is provided between the first separation module and the second separation module, and wherein the heating module increases the temperature of the functional solvent in which the water has been dissolved, supplied from the first separation module to the second separation module, and wherein the first separation module is configured to separate the mixture water into layers.

11. A desalination apparatus using a solvent extraction scheme, the desalination apparatus comprising:

a source water supply module configured to supply first source water comprising salt of a first concentration and water;

a functional solvent supply module configured to supply a functional solvent of which solubility in water varies according to temperature;

a mixing module configured to generate mixture water by mixing the first source water and the functional solvent;

a first separation module configured to receive the mixture water from the mixing module and dissolve the water contained in the first source water in the functional solvent at a first temperature;

a salt crystallization module configured to receive, from the first separation module, second source water comprising salt of a second concentration that is higher than the first concentration, the second source water being the first source water from which the water has been removed;

a second separation module configured to receive the functional solvent in which the water has been dissolved, from the first separation module, and thermally separate the water and the functional solvent at a second temperature that is higher than the first temperature; and a first heat exchanger configured to exchange heat between the functional solvent in which the water from the first separation module has been dissolved, and the thermally separated functional solvent from the second separation module, wherein the first separation module is configured to separate the mixture water into layers.

12. A desalination apparatus using a solvent extraction scheme, the desalination apparatus comprising:

a source water supply module configured to supply first source water comprising salt of a first concentration and water;

a functional solvent supply module configured to supply a functional solvent of which solubility in water varies according to temperature;

a mixing module configured to generate mixture water by mixing the first source water and the functional solvent;

a first separation module configured to receive the mixture water from the mixing module and dissolve the water contained in the first source water in the functional solvent at a first temperature;

a salt crystallization module configured to receive, from the first separation module, second source water comprising salt of a second concentration that is higher than the first concentration, the second source water being the first source water from which the water has been removed;

a second separation module configured to receive the functional solvent in which the water has been dissolved, from the first separation module, and thermally separate the water and the functional solvent at a second temperature that is higher than the first temperature; and a second heat exchanger configured to exchange heat between cooling water that has cooled the salt crystallization module and the functional solvent thermally separated from the second separation module and recovered to the functional solvent supply module;

wherein the first separation module is configured to separate the mixture water into layers.

13. A desalination method using a solvent extraction scheme, the desalination method comprising:

an operation of supplying first source water comprising salt of a first concentration and water and a functional solvent of which solubility in water varies according to temperature;

an operation of generating mixture water by mixing the first source water and the functional solvent;

a first separation operation of receiving the mixture water and dissolving the water contained in the first source water in the functional solvent at a first temperature to separate the mixture water into layers; and a second separation operation of receiving the functional solvent in which the water has been dissolved, and thermally separating the water and the functional solvent at a second temperature that is higher than the first temperature.

14. The desalination method of claim 13, further comprising:

after the first separation operation, an operation of receiving second source water comprising salt of a second concentration that is higher than the first concentration, the second source water being the first source water from which the water has been removed, and crystallizing salt ions of the second concentration.

15. The desalination method of claim 13, wherein the functional solvent thermally separated in the second separation operation is reused in the operation of supplying the first source water and the functional solvent.

* * * * *